United States Patent [19]

Gorges et al.

[11] 3,968,862

[45] July 13, 1976

[54] KINETIC ENERGY ABSORBING VALUE ASSEMBLY

[75] Inventors: Franz A. Gorges, Sun Valley; James E. Robertson, Woodland Hills, both of Calif.

[73] Assignee: Menasco Manufacturing Company, Burbank, Calif.

[22] Filed: Mar. 20, 1974

[21] Appl. No.: 452,920

[52] U.S. Cl............................ 188/1 C; 188/282; 188/317; 188/322; 213/1 A; 267/139; 293/1; 293/70
[51] Int. Cl.².................. B60R 19/06; B61F 19/04; F16D 63/00; F16F 9/30
[58] Field of Search............ 188/1 C, 282, 317, 322; 213/1 A; 267/139; 293/1, 60, 70, 84

[56] References Cited
UNITED STATES PATENTS

| 446,426 | 2/1891 | Bryon, Jr. .......................... 188/317 |
| 1,123,744 | 1/1915 | Holt ............................... 188/317 X |
| 1,434,024 | 10/1922 | Ree ................................. 188/317 |
| 2,356,563 | 8/1944 | Bingham ........................ 188/317 X |
| 2,393,559 | 1/1946 | Poppas............................ 188/317 X |
| 2,997,325 | 8/1971 | Peterson .................... 293/1 |
| 3,182,449 | 5/1965 | Kerney et al.................... 188/1 C X |
| 3,715,114 | 2/1973 | Thorsby et al.................... 293/70 X |
| 3,715,139 | 2/1973 | Tuggle .............................. 293/70 |
| 3,831,997 | 8/1974 | Myers ............................. 293/70 X |

FOREIGN PATENTS OR APPLICATIONS

| 158,042 | 3/1957 | Sweden............................ 188/322 |

*Primary Examiner*—Robert J. Spar
*Assistant Examiner*—Howard Beltran
*Attorney, Agent, or Firm*—Robert E. Geauque

[57] ABSTRACT

An energy absorption unit wherein a piston is movably mounted in a compressible solid chamber, the piston including first and second passages, the compressible solid material to be conducted only through said first passages during low energy damping levels, a valve means connected to said piston through a shear pin assembly, said valve means normally closing said second passages, at a predetermined high energy level said shear pin assembly being caused to fail also permitting conductance of said compressible solid material through said second passages.

1 Claim, 8 Drawing Figures

UNIT ONLY

UNIT PLUS VEHICLE

KINETIC ENERGY ABSORBING VALUE ASSEMBLY

BACKGROUND OF THE INVENTION

The field of this invention relates to energy absorption apparatuses and more particularly to a spring damper which employs the use of a compressible solid material with the device of this invention to have a first damping rate for low energy loads and a second damping rate for high energy loads.

The energy absorption unit of this invention has been found to be especially useful in automobiles to be located between the body of the vehicle and the bumper. However, it is considered to be within the scope of this invention to employ the apparatus of this invention in any other environment as it is well known that spring damping apparatuses are used in numerous fields.

Automobiles have always employed some means to protect the body of the vehicle from slight bumps. Such means have normally been referred to as bumpers which are located in the front and rear portions of the vehicle. The bumpers are formed normally of a rigid piece of material, such as steel, which is secured to the vehicle. Upon the vehicle being struck by another vehicle, or if the vehicle strikes a fixed object, the material of construction of the bumper normally fails upon incurring even a slight, small impact force. Additionally, such bumpers normally directly transmit the force into the vehicle itself. Such transmission of force is undesirable since it causes further damage to the vehicle and frequently causes injury to the vehicle occupants.

Heretofore, bumpers have been developed for vehicles which absorb impact forces and attempt to minimize the transmission of a significant amount of the impact force into the vehicle structure. The energy absorption units which are employed upon these bumpers are designed to absorb a low energy impact force, such as up to 10 miles per hour, with the vehicle not incurring any damage. However, upon the vehicle being struck with a large impact force, the energy absorption units of the prior art will fail immediately, thereby not absorbing any energy with the result that the effect of the energy absorption unit is completely negated. It would be desirable to design an energy absorption unit which could absorb impact energies at a normal closing velocity of say 10 miles per hour without causing any damage to the vehicle and it would also be desirable that if the vehicle is subjected to a very high velocity such as 50 miles per hour, that the unit would function and absorb some of the impact energy. It is considered feasible that a vehicle would be designed, if driven into a solid barrier at a very high velocity, a finite portion of the impact energy could be absorbed by the energy absorption units, and the remaining impact energy absorbed by the vehicle collapsing in a particular manner, with the result that the impact energy transferred into the passenger compartment is minimized.

SUMMARY OF THE INVENTION

The energy absorption unit of this invention is designed to repeatably absorb all of the impact energy up to a predetermined velocity, such as 10 miles per hour. Above this velocity, the energy absorption unit of this invention is designed to absorb a greater portion of the energy one time only, with the remaining portion of the total energy being absorbed by the vehicle structure. The apparatus of this invention provides a bumper unit that effectively absorbs energy beyond its normal design velocity. Also, the bumper unit allows design of a total system that minimizes the g level experienced by the passenger compartment and hopefully this will decrease the extent of injuries received by the occupants of the vehicle.

The apparatus of this invention employs a cylinder which is closed at one end and has an opening therein for the piston rod at the other end. The piston and a compressible solid material is located within the chamber formed within the cylinder. The piston is movable within the chamber and includes orifice means to permit movement of the compressible solid material from one side of the piston to the other. A seal surrounds the piston rod and is in contact with the cylinder adjacent the other end. The orifice means within the piston includes a first passage means and a second passage means. A valve means is mounted directly adjacent to the piston and normally functions to close the second passage means. At low velocities of impact, the compressible solid material flows only through the first passage means. At high velocities of impact, a sufficient force level is built up which causes movement of the valve means thereby opening the second passage means.

DETAILED DESCRIPTION OF THE SHOWN EMBODIMENT

Figure 1:
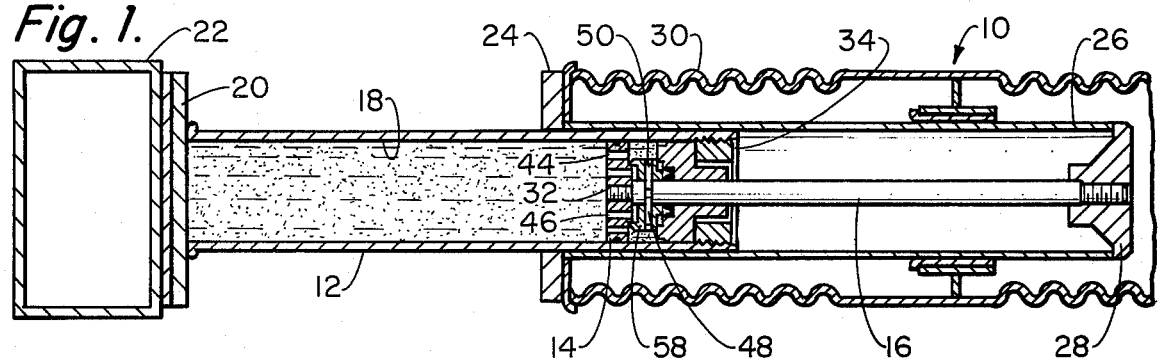
FIG. 1 is a longitudinal cross-sectional view of the energy absorption unit of this invention as it would be mounted within a vehicle structure between the bumper of the vehicle and the frame of the vehicle.
Figure 2:
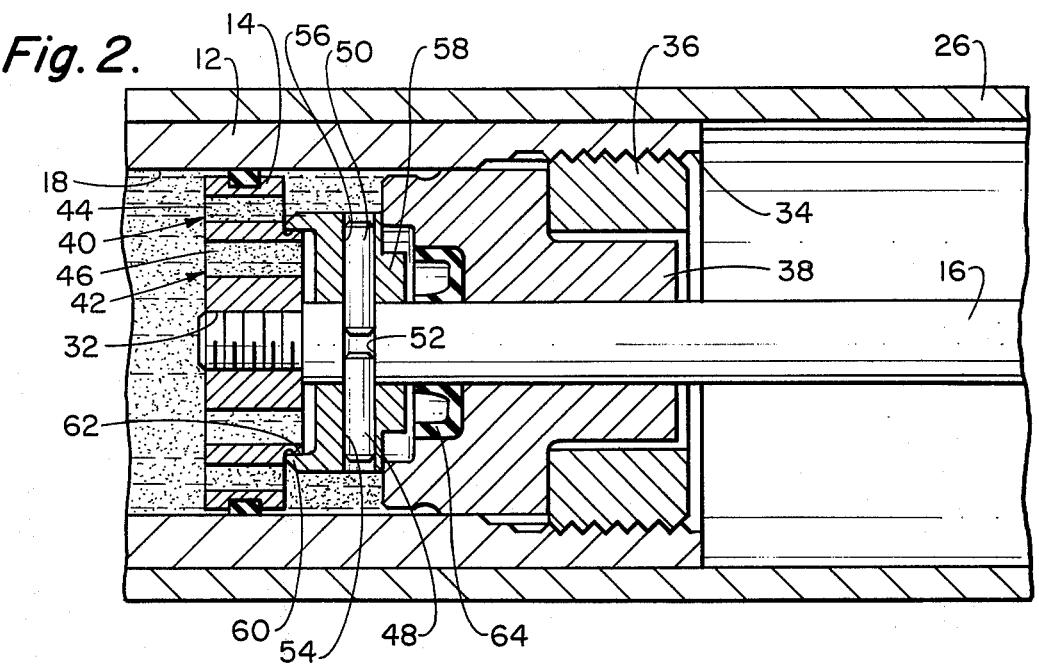
FIG. 2 is an enlarged cross-sectional view of the piston and its associated valve means employed within this invention.
Figure 3:
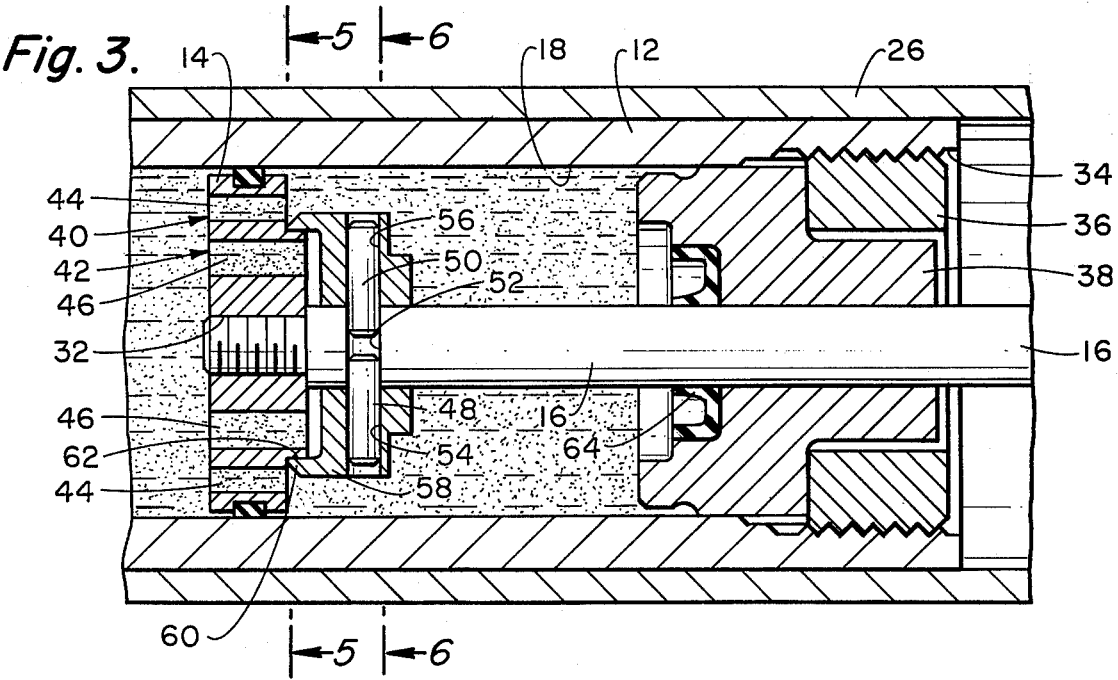
FIG. 3 is a view similar to FIG. 2 but showing the piston in an extended position.
Figure 4:
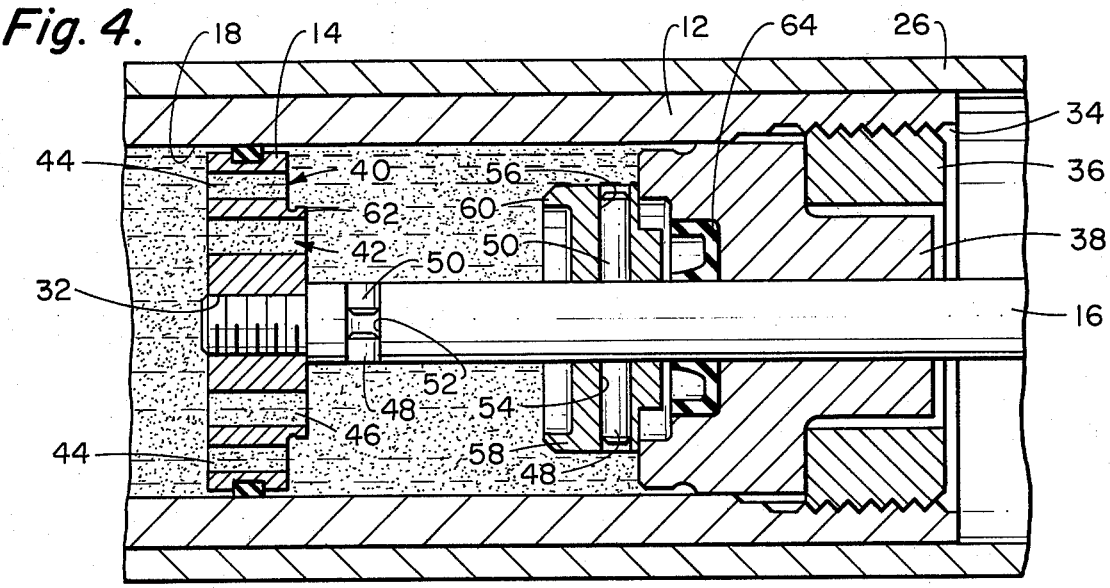
FIG. 4 is a view similar to FIG. 3 showing the valve means being displaced with both the first passage means and the second passage means being open.
Figure 5:
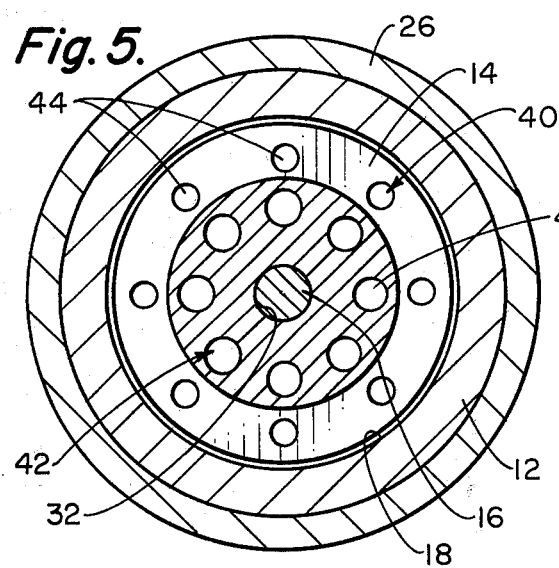
FIG. 5 is a cross-sectional view taken along line 5—5 of FIG. 3.
Figure 6:
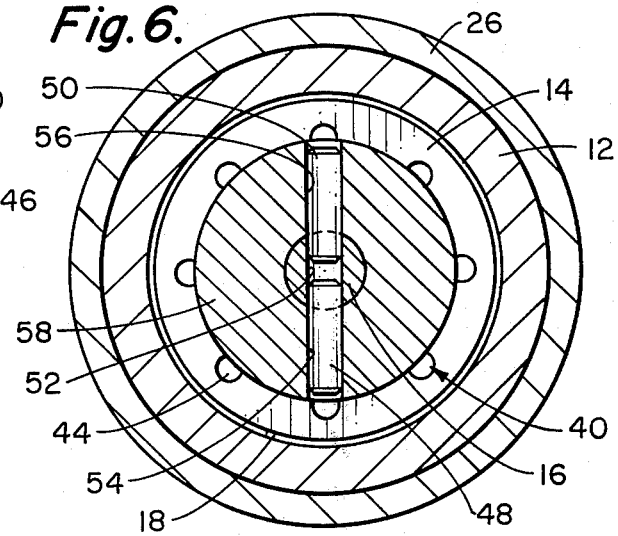
FIG. 6 is a cross-sectional view taken along line 6—6 of FIG. 3.

Referring particularly to the drawings, there is shown in FIG. 1 the energy absorption unit 10 of this invention being basically composed of cylinder 12, a piston 14, a piston rod 16 with the piston being located within chamber 18 of the cylinder 12. The cylinder 12 is substantially cylindrical. The chamber 18 is closed at one end by attachment of end plate 20. The end plate 20 is to be secured to a structure such as an automobile bumper 22 which is spaced outwardly from the frame 30 of the vehicle.

Attached to the frame 30 is an outer sleeve 26 and a flange 24 which surrounds a portion of the cylinder 12. The cylinder 12 is snugly retained within the sleeve 26 but is to be freely movable in the longitudinal direction with respect thereto. The free end of the sleeve 26 is closed by a plug 28. The free end of the piston rod 16 is fixedly secured to the plug 28. The piston 14 includes a threaded aperture 32 through which the piston rod 16 is threadably secured.

Fixedly mounted about the sleeve 26 is a compressible section of automobile frame 30. The frame 30 is to support the sleeve 26 during low velocity collisions and to absorb a large part of the energy of collision during high velocity collisions.

Threadably secured within the open end 34 of the cylinder 12 is a nut 36. A seal block 38 surrounds a portion of the piston rod 16 and is positioned to be in abutting engagement with the inner end of the nut 26. Mounted within the seal block 38 is an appropriate plastic annular seal 64 which is to prevent conducting of the damping substance exteriorly of the energy absorption unit around the piston rod 16. The seal construction is composed of the nut 36, seal block 38 and the plastic seal 64. The seal construction is deemed to be conventional and forms no specific part of this invention. Any conventional or non-conventional sealing mechanism could be employed without departing from the scope of this invention.

To be located within the chamber 18 is a compressible solid material which is conventionally available from Dow Corning Corporation under the trade name of "Silastic". However, it is to be understood that the apparatus of this invention may be employed with other types of compressible solid materials as well as compressible fluid materials.

Formed within the piston 14 is a first orifice means 40 and a second orifice means 42. The first orifice means 40 comprises a plurality of spaced apart first passages 44 which are specifically located about the piston rod 16. Also formed within the piston 14 are a plurality of spaced apart second passages 46 which are similarly concentrically arranged with respect to the piston rod 16. The second passages 46 are positioned radially inward with respect to the first passages 44. It is to be noted that there are an equal number of first passages 44 and second passages 46. The number of the passages is considered to be a matter of choice and also the number of first passages may be different than the number of second passages. It is also to be noted that the second passages 46 are of a larger diameter than the first passage 44. However, this is considered to also be a matter of choice and by selecting the size of first passages and the size of the second passages, the energy absorption characteristics of the unit 10 of this invention can be varied.

Attached to the piston rod 16 are shear pins 48 and 50 which cooperate within an opening 52 formed in the piston rod 16. The pins 48 and 50 also extend within openings 54 and 56 respectively formed within a valve block 58. The valve block 58 includes an outer flange 60 which is to be capable of cooperating with a shoulder 62 formed on the aft side of the piston 14. With the flange 60 abuttingly in contact with the shoulder 62, the valve block 58 functions to close the second passages 46 of the second orifice means 42 and not permit flow of the damping substance therethrough from one side of the piston 14 to the other side of the piston 14.

The function of the apparatus of this invention is as follows: when the automobile bumper 22 encounters a low velocity impact force (for example up to 10 miles per hour), the piston 14 is moved through the chamber 18 with the compressible solid material being forced through the first passages 44 of the first orifice means 40. The size and number of the first passages 44 are selected in view of the mass of the vehicle so that all of the impact energy is absorbed at the velocity of ten miles per hour without the piston 14 "bottoming out" which will normally result in damage and require replacement of the energy absorption unit 10.

The unit 10 is to be designed of a sufficient strength so as to absorb energy above the 10 miles per hour velocity even though the piston 14 will bottom out. However, at a certain selected impact energy level, the force will be great enough to cause the shear pins 48 and 50 to fail and permitting the valve block 58 to be displaced along the piston rod 16 from the piston 14. This energy level would normally be between 15 and 25 miles per hour.

With the valve block 58 displaced, the energy absorption substance is capable of being conducted through the second passages 46 as well as the first passages 44. Therefore, now the energy absorption unit is capable of absorbing energy at a higher impact velocity. If the second passages 46 were not opened, the energy absorption unit would structurally fail at a high impact energy level completely negating the effect of the unit.

Figure 7:
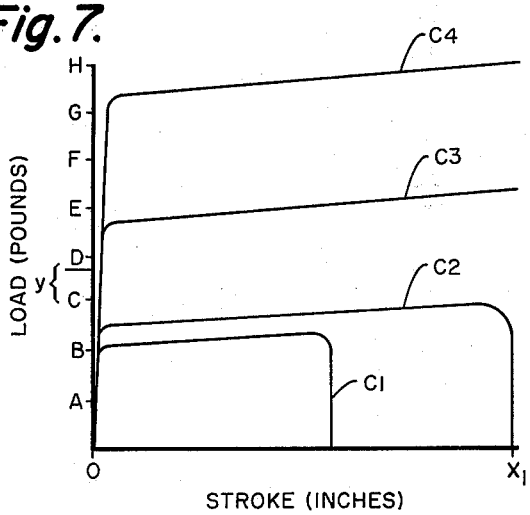
FIG. 7 is a graph of the energy absorption characteristics of the apparatus of this invention.

Referring particularly to FIG. 7 of the drawings, there is shown a graph of the energy absorption characteristics of the unit of this invention. The load is represented by points A, B, C, D, and so forth, and are normally in increments such as 5,000 pounds. The stroke represents the entire movement of the piston 14 which is to be of a value such as 8 inches with $X_1$ representing the total length of stroke. Curves $C_1$ and $C_2$ represent the energy absorption characteristics of the unit of this invention without failure of the shear pins 48 and 50. It is to be noted that at the completion of the absorption of energy, the piston 14 will automatically be moved back to the initial position. This is due to the fact that the internal pressure of the compressible solid material within the chamber 18 is increased due to the decrease in volume caused by the insertion of the piston 16 within the chamber 18. This internal pressure will automatically cause the piston to be moved back to its initial position when the total impact energy has been absorbed. Curves $C_1$ and $C_2$ can represent certain impact levels such as 5 miles per hour and 10 miles per hour.

Curves $C_3$ and $C_4$ represent high impact energy. Upon the load reaching $Y_C$, the shear pins 48 and 50 fail resulting in the opening of the second passages 46. Curves $C_3$ and $C_4$ represent two different load-stroke curves for the same 50 m.p.h. collision, with curve $C_3$ representing the energy absorption with both passages 44 and 46 open and curve $C_4$ representing the energy absorption characteristics with only passages 44 open. The load level of curve $C_4$ exceeds the vehicle frame crush strength. This would result in the frame crushing before the unit 10 would stroke, thus subjecting unit 10 to possible damage from compressible frame 30 before unit 10 could absorb any energy. Curve $C_3$ does not exceed the vehicle frame crush strength and the entire impact energy will therefore be absorbed by the units 10 of this invention, plus the vehicle structure. The actual *g* level which will be experienced within the passenger compartment of the vehicle will be significantly less and hopefully will save the occupants of the vehicle from severe injury.

Figure 8:
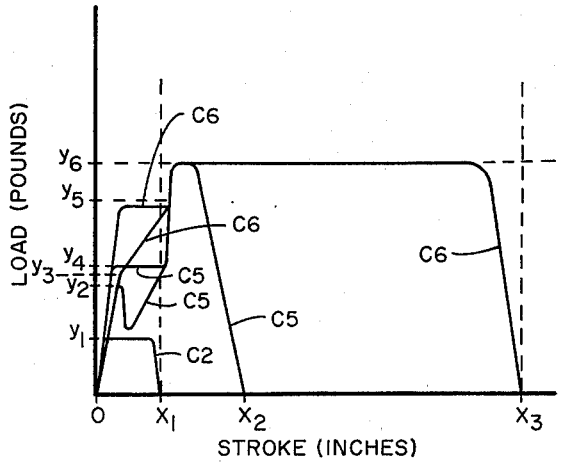
FIG. 8 is a graph of the energy absorption characteristics of the apparatus of this invention plus the energy absorption characteristics of the vehicle.

Referring particularly to FIG. 8 of the drawings, a similar graph of the energy absorption characteristics of both the vehicle and the units is shown. Curve $C_2$ depicts with a total load of $Y_1$ with the entire stroke of the vehicle comprisng $X_1$ which is the stroke of the energy absorption unit 10 itself. This curve $C_2$ is the same curve $C_2$ shown in FIG. 7 and is to represent a figure such as 10 miles per hour. There will be no damage done to the vehicle and after impact, the unit 10 would return to its initial position for reuse.

Curve $C_5$ is a curve representing a force load level in between 10 miles per hour and 50 miles per hour (such as 30 miles per hour). It is to be noted that the stroke, represented by point $X_1$, of the energy absorption unit 10, is exceeded; with the result that the frame of the vehicle collapses a certain amount, with the total stroke being represented by point $X_2$. As is readily apparent from curve $C_5$, the vehicle is capable of absorbing additional energy.

At a impact load level $Y_5$, Curve $C_6$ represents the energy absorption characteristics at 50 miles per hour. The unit 10 absorbs some of the impact energy with the major portion of the energy being absorbed by the vehicle itself. However, by the inclusion of the units 10 of this invention, the overall force level to which the vehicle is subjected is maintained at a value below the vehicle crush strength which is represented by point $Y_6$. Therefore, there is a good chance that the occupants of the vehicle will not be fatally injured. The amount of stroke of curve $C_6$ is represented by point $X_3$ which is the maximum crush permitted at 50 miles per hour. It is desired that Curve $C_6$ not exceed this maximum crush or else the area of the passenger compartment of the vehicle will be crushed.

What is claimed is:

1. An energy absorption unit comprising:
    a tubular housing having an internal chamber formed therein, said housing having a closed end and an open end;
    a substance contained within said chamber being capable of absorbing energy;
    a piston movably supported within said chamber;
    an orifice means associated with said piston for permitting said substance to move from one side of said piston to the opposite side of said piston to produce a damping resistance force on said piston head;
    a piston rod secured to said piston and extends exteriorly of said housing through said open end;
    sealing means mounted within said chamber adjacent said open end of said cylinder, said piston rod passing through said sealing means and being movably mounted in respect thereto;
    said orifice means comprising first and second passage means, said substance being adapted to move through said first passage means from one side of said piston to the other side of said piston and absorb energy;
    valve means movable relative to said piston head, said valve means being connected by frangible pin means to said piston rod to be normally positioned directly adjacent said piston head, with said valve means positioned directly adjacent said piston head said second passage means being closed, upon a certain predetermined pressure level being attained within said chamber said frangible pin means breaking apart permitting said valve means to slidably move on said piston rod to a displaced position opening said second passage means for passage therethrough of said substance.

* * * * *